United States Patent
Lauther

(10) Patent No.: US 7,489,676 B2
(45) Date of Patent: Feb. 10, 2009

(54) COMMUNICATION METHOD OF EXCHANGING REAL-TIME DATA IN A COLLISION RECOGNITION-BASED COMMUNICATION NETWORK, CORRESPONDING MEMORY MEDIUM AND COMMUNICATION NETWORK

(75) Inventor: Ulrich Lauther, München (DE)

(73) Assignee: Siemens AG, Munich (DE)

( * ) Notice: Subject to any disclaimer, the term of this patent is extended or adjusted under 35 U.S.C. 154(b) by 745 days.

(21) Appl. No.: 10/494,342

(22) PCT Filed: Oct. 1, 2002

(86) PCT No.: PCT/EP02/11017

§ 371 (c)(1),
(2), (4) Date: Apr. 30, 2004

(87) PCT Pub. No.: WO03/039082

PCT Pub. Date: May 8, 2003

(65) Prior Publication Data

US 2005/0002413 A1     Jan. 6, 2005

(30) Foreign Application Priority Data

Oct. 31, 2001  (EP) ................. 01126052

(51) Int. Cl.
*H04L 12/28* (2006.01)
(52) U.S. Cl. ..................... 370/351; 370/445
(58) Field of Classification Search ......... 370/445
See application file for complete search history.

(56) References Cited

U.S. PATENT DOCUMENTS

| | | | |
|---|---|---|---|
| 5,842,173 A * | 11/1998 | Strum et al. ............... 705/1 |
| 6,101,188 A | 8/2000 | Sekine et al. | |
| 6,189,022 B1 | 2/2001 | Binns | |
| 6,418,139 B1 * | 7/2002 | Akhtar ...................... 370/356 |
| 6,483,846 B1 * | 11/2002 | Huang et al. ............... 370/445 |
| 6,618,379 B1 * | 9/2003 | Ramamurthy et al. .. 370/395.41 |
| 2001/0002195 A1 | 5/2001 | Cruz et al. | |
| 2002/0075804 A1 * | 6/2002 | Le et al. ................... 370/235 |
| 2005/0163140 A1 * | 7/2005 | Dally et al. ................ 370/412 |
| 2007/0147238 A1 * | 6/2007 | Kadambi et al. ........... 370/229 |

FOREIGN PATENT DOCUMENTS

| EP | 1 009 189 A | 6/2000 |
|---|---|---|
| WO | 00/03521 A1 | 1/2000 |

OTHER PUBLICATIONS

Krause: "Konzept Echtzeit-Ethernet V 1.0", Report Aug. 10, 2000.

(Continued)

*Primary Examiner*—Steven H Nguyen
(74) *Attorney, Agent, or Firm*—Sughrue Mion, PLLC

(57) ABSTRACT

A method for exchanging data in a collision-recognition based communication network, for example, the Ethernet, whereby, before a cyclic repeating real-time data exchange, a routing of the real-time data exchange onto the most economical data path occurs, followed by a scheduling of the messages in the real-time data exchange by means of a greedy heuristic, in order to permit a conflict-free cyclic repeating real-time data exchange with the lowest possible cycle time.

11 Claims, 2 Drawing Sheets

OTHER PUBLICATIONS

Krause "Konzept Isochrones Echtzeit-Ethernet V1.4", Report Feb. 2, 2001.

Ulrich Lauther: "TURBO Programmer's Manual - Table of Contents", Apr. 18, 2001.

Ulrich Lauther: "TURBO Programmer's Manual - Introduction To The TURBO Library", Nov. 22, 1999.

Ulrich Lauther: "TURBO Programmer's Manual - Frequently Asked Questions", Dec. 24, 2000.

E.W. Dijkstra, A note on two problems in connection with graphs:, Numer.Math., 1(1959), pp. 269-271.

R. Carraghan and P.M. Padalos, "An Exact Algorithm for the Maximum Clique Problem", Operations Research Letter 9, 1990, pp. 375-382.

S. French: "Sequencing and Scheduling", Ellis Horwood Limited, Chichester, 1990.

* cited by examiner

M1: B→C,D
M2: A→C
M3: A→D
M4: B→C switches: A, B, C, D
ports: (1), (2), (3)
message: M1, M2, M3 messages: M1, M2, M3
〜〜▶ Longest path message: M2, M3
duplicate messages: M1', M1"

switches: A, B, C, D
ports: (1), (2), (3)
messages: m1, m2, m3

▭  m4 scheduled early
⊏⊐  m4 scheduled late
$t_e$  earliest time for m4
$t_l$  latest time for m4
s  slack of m4 switches: A, B, C, D
ports: (1), (2), (3)
messages: m2, m3
duplicate messages: m1', m1"

message: M2
duplicate messages: M1', M1"

switches: A, B, C, D
ports: (1), (2), (3)
message: M2
duplicate messages: m1', m1"

M1: A → C
M2: A → C switches: A, B, C
ports: (1), (2), (3)
messages: M1, M2 switches: A, C
ports: (2), (4)
messages: m1, m2 switches: A, B, C
ports: (1), (2), (4)
messages: m1, m2

US 7,489,676 B2

COMMUNICATION METHOD OF EXCHANGING REAL-TIME DATA IN A COLLISION RECOGNITION-BASED COMMUNICATION NETWORK, CORRESPONDING MEMORY MEDIUM AND COMMUNICATION NETWORK

This application is the national phase under 35 U.S.C. § 371 of PCT International Application PCT/EP02/11017, with an international filing date of Oct. 1, 2002, which designated the United States of America and was published under PCT Article 21(2) in German, and the disclosure of which is incorporated into this application by reference.

FIELD OF AND BACKGROUND OF THE INVENTION

The invention relates to a communication method of a real-time data exchange in a collision detection-based communication network, e.g., the real-time Ethernet where a real-time data exchange is undertaken deterministically, for example predictably, via a conventional Ethernet network.

Such a system is known for example from International Patent Application WO 00/03521, in which corresponding middleware between the user program and the Ethernet protocol prevents data collision during real-time data transmission. One of the disadvantages of this method, however, is that this middleware must be available in each network node.

A solution is proposed in United States Patent Application US 2001/0002195 A1 in which device adapters are placed at the periphery of the network to which specific time slots are assigned within which these devices can then exclusively send data packets. This, however, leads to low use of the resources.

OBJECTS OF THE INVENTION

One object of the invention is to specify a method for communication of real-time data exchange in a collision recognition-based communication network through a corresponding memory medium and a communication network in which the above-mentioned disadvantages are avoided.

SUMMARY OF THE INVENTION

In accordance with one embodiment of the invention, the above and other objects are achieved with regard to the method by a method of communication for real-time data exchange in a collision detection-based communication network the method comprising determining the most economical data paths of the network; routing cyclic repeating real-time data traffic to the most economical data paths of the network; and scheduling, starting from the most economical data paths determined, send times which are determined for messages of the cyclic repeating real-time data exchange with the aid of a greedy heuristic, wherein a message with the earliest possible execution time is given a highest priority and new execution times are calculated for the messages assigned to send times not yet determined, and wherein further, the routing and scheduling steps are repeated until all messages are arranged in a priority list and a chronological message occupancy of switching ports of the communication network and an associated cycle duration is established.

In accordance with another embodiment of the invention, a collision detection-based communication network for real-time data exchange is provided that comprises a unit that causes the following steps to be executed: determining most economical data paths of the network; routing the cyclic repeating real-time data on the most economical data paths; and scheduling, starting from the most economical data paths determined, send times, which are determined for the messages of the cyclic repeating real-time data exchange with the aid of a greedy heuristic, with the message with an earliest possible execution time being given the highest priority and wherein new execution times are calculated for the messages assigned to send times not yet determined and the routing and scheduling steps are repeated until all messages are arranged in a priority list and a chronological message occupancy of the switching ports of the communication network, as well as the associated cycle duration, is established.

According to at least one aspect of the invention, a method for a collision recognition-based communication network, for example the Ethernet, is provided in which, at intervals before a cyclic repeating real-time data exchange, a routing of the real-time data exchange onto the most economical data path occurs followed by a scheduling of the messages in the real-time data exchange by means of a greedy heuristic, in order to permit conflict-free cyclic repeating real-time data exchange with the lowest possible cycle time.

BRIEF DESCRIPTION OF THE DRAWINGS

The invention will be explained below on the basis of the exemplary embodiments shown in the drawings, in which.

DETAILED DESCRIPTION OF THE PREFERRED EMBODIMENTS

Figure 1:
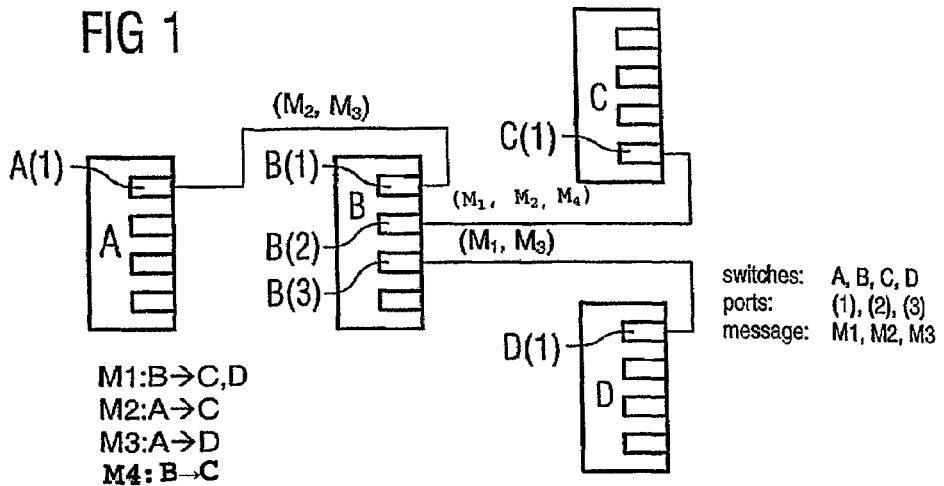
FIG. 1 illustrates a small example in accordance with the invention with three messages and four switches.

In a real-time Ethernet, which is used for fast communication between components, such as sensors, drives or controllers, for example, plannable messages are exchanged within a system in a cyclic manner. For these messages, both the paths, which are between the transmitter and the receiver, and also the times within a cycle, when the messages pass the switches of the network, can be defined in an initialization or setup phase so that no conflicts arise between these messages. In this way, the communication becomes free of any non-determinism and real-time behavior is possible.

In accordance with one embodiment, the communication cycle is split into a real-time part containing these planned messages and a non-real-time part in which the unplanned transactions occur using standard TCP/UDP/IP methods.

The real-time part should occupy the minimum possible space in the overall cycle, to keep a sufficiently large area available for unplanned transactions.

The network consists of switches and bidirectional connections (links). Each link connects a pair of switches or, to put it more precisely, ports of these two switches. The links cause delays which are proportional to the length of the links. Furthermore fixed delay times are assumed for a message to be passed via a switch. The delay, thus, subsumes the approval of a synchronization jitter which is not considered for scheduling. The assumption of a defined delay of a switch implies that a switch does not buffer any messages in order to defer forwarding the messages until later.

The topology of the network is typically ring-shaped or tree-shaped but is not restricted to these simple topologies.

Starting from a description of the network elements and the network topology, of the messages and their transmitters and receivers as well as global design parameters, a path through the network is determined for each message by a routing system and the points in time at which the messages pass through the relevant switches are defined, in which case the total time for all messages to be sent is minimized. Ancillary conditions for the associated routing and scheduling tasks are explained in greater detail below. In principle, routing and scheduling are not independent tasks; the selection made in the routing phase influences the quality of the scheduling. In a variant of the present embodiment, the routing and scheduling are viewed independent of each other.

The Routing Problem

A network description and a list of messages serve as an input variable for routing. For each message the sending switch and a set of receiving switches are known. A routing task consists of finding a path, that is a set of switches or their ports, in order to pass the message on to its intended destination. If a message k features intended destinations, it can be sent simultaneously by the transmitter to all recipients, in which case it is branched off at intermediate switches (broadcast mode), or it can be sent independently of the transmitter at k different points in time to the k recipients. In addition, variants between these two extremes are also possible. As described later, the choice between these options is not trivial and can be made during a scheduling process. As a result of the routing process the links and ports and the arrival times relative to the time at which the message was sent are then fixed for each message, with the arrival times being able to be calculated in a simple way by summing the delays from the links and switches over which a message passes.

The Scheduling Problem

An object of the scheduling process is to assign absolute points in time for the sent messages in such a way that no conflicts arise between the messages, further and, such that the overall cycle time for the transmission of all messages (make span) is minimized. Through the conditions created by the routing process, the arrival times at all ports which are used by the messages, are also defined automatically.

However potential conflicts arise between these messages since the ports can only connect one message at any given point in time.

If, for example, an output port p and two messages $m_i$ and $m_j$ which use this port are considered, the result is as follows:

The two messages are sent at the corresponding transmitters at points ti and tj and are available at times;

$$t_{i,p} = t_i + \delta_{i,p}$$

and $$t_{j,p} = t_j + \delta_{j,p}$$

at output port p, in which case $\delta_{i,p}$ represents the sum of a delay between the transmitter of the message mi and the output port p. Provided the two messages have a length or duration of $l_i$ and $l_j$, respectively, and it is possible that the message $m_i$ can use port p before message $m_j$ or vice versa, the following inequalities are produced:

$$t_j \geq t_i + d_{i,j},$$

with $$d_{i,j} = {}^{max}_p \delta_{i,p} - \delta_{j,p} + l_i$$

and $$t_j \leq t_i - d_{j,i}$$

with $$d_{j,i} = {}^{max}_p \delta_{j,p} - \delta_{i,p} + l_j$$

Additional resource conflicts at port inputs do not need to be taken into consideration if the conflicts at the port outputs are resolved by the scheduling. If two such messages do not follow each other directly, the gaps between the two messages must naturally also be considered during scheduling.

It is thus an object of the scheduling process to assign each message to one or more send times in such a way that all inequalities are fulfilled and thereby the totality of the transmission of messages is minimized.

Central Data Structure

The following data structures can advantageously be used for example for programmed implementation:

Messport: Describes a message passed on to a port and includes the relative arrival time of the message at the port, a pointer to the message and a pointer to the port.

Port: Describes a port and shows the associated switch and the link connected to it. In addition the data structure contains a list of the Messports to provide access to all messages which use this port. The latter information is the result of the routing phase.

Switch: Describes a switch and contains the name of the switch as well as pointers to its ports.

Link: Describes a link and contains the length or the delay of the link as well as pointers to the two ports which are interconnected by this link.

Message: Describes a message and contains the message name, the length of the message, a pointer to the sending switch, a list with the receiving switches, a list of Messports which provide access to all of the ports through which the message passes and the associated arrival times of the message defined by scheduling. The list of Messports is the result of the routing phase and the times the result of the scheduling phase.

Constraint: Describes a condition between scheduling times of two messages, for example, as shown by the inequalities specified above.

Component: Describes a linked component of a constraint graph and contains a list of all messages and ports which belong to the component concerned.

Routing

For routing purposes, the network is modeled by a graph. There are a number of modeling options, however, it is sufficient to model a switch as a node and a link as a connector of a routing graph. Since all links are bidirectional, an undirected graph from the TURBO-C++ class library, for example, can be used. For routing the commonly known "Dijkstra algorithm" can be used in order to form the shortest path tree for each message, starting from the switch sending the message in each case. On efficiency grounds, the priority queue needed by the Dijkstra algorithm is used for the nodes provided with labels but not yet dealt with is implemented as a radix queue. The tree creation process is stopped when all destination nodes or receiving switches have a permanent label. A backwards pointer enables the shortest path from the destination node back to the root node of the tree to be followed in a simple way, where Messport objects are created they are inserted into the appropriate Messport lists of the appropriate message and of the port. The essential result of the routing are the Messport objects contained in the port and message objects. This gives simple access to all messages which pass through a specific port and to all ports which are traversed by any particular given message.

Scheduling

The scheduling conditions specified above can, for example, also be modeled by an undirected graph, with the nodes of the graph corresponding to messages and the connectors corresponding to conditions which must be fulfilled for an allocation of the times to the two messages. This method, however, results in a large number of "plane-parallel" conditions of which only the strongest are relevant for scheduling. The conditions can either be stored explicitly in the graph for the conditions, for example in a matrix to obtain fast access for a pair of nodes, or can also be represented implicitly and only created when ports which are used by a specific message are investigated. In this case processing time can be saved when the scheduling problem is successfully split into smaller subproblems which can be resolved independent of each other. This is successful if there are no direct or indirect conditions between the messages.

Since the scheduling problem cannot generally be resolved to produce the optimum result by using efficient algorithms, a lower limit is determined to evaluate the heuristics to the scheduling in order to have an estimate of the distance from the optimum. This lower limit can, for example, be formed on the basis of messages which use a specific port, in which case all message lengths are summed for each port and the maximum formed from these lengths represents a lower limit for the entire cycle time (make span). Thus, for calculating better lower limits, maximum subsets of messages between which pairs of conditions exist, that is, maximum groups (cliques), can be incorporated into the condition graphs.

Greedy heuristics are used for the actual scheduling, which involves a priority scheme being used to allocate messages in accordance with the shortest execution time. After a message has been scheduled, the new lowest execution time for all messages not yet planned by scheduling and their priorities is assigned (updating). One implementation option consists of a priority queue for the not yet planned (unscheduled) messages as well as a condition graph for updating the lowest execution time and can be described, for example, by the following dummy code Table 1:

TABLE 1

```
queue_schedule (1)  {
    forall messages m    {
        lowest_feasible_time(m) = 0;
        put m into priority queue;
    }
    while (queue not empty)   {
        select message m to schedule from priority queue;
        delete message m from priority queue;
        schedule m at lowest feasible time;
        for all affected messages h  {
            update lowest time of h;
            update priority queue;
        }
    }
}
```

However, without any significant adverse effects, the priority queue can simply be replaced by a list for the messages not yet planned, which produces the following exemplary dummy code, as shown in Table 2, for scheduling:

TABLE 2

```
list_schedule( ) {
    forall messages m    {
        lowest_feasible_time(m) = 0;
        put m into list of unscheduled messages;
    }
    while (list not empty) {
        select message m to schedule from unscheduled list;
        delete message m from unscheduled list;
        schedule m at lowest feasible time;
        for all affected messages h  {
            update lowest time of h;
        }
    }
}
```

A simpler and faster variant of scheduling takes account of the fact that each upwards connector of the condition graph is actually used twice and can be specified by the following dummy code shown in Table 3:

TABLE 3

```
fast_simple_schedule( )    {
    forall messages m     {
        lowest_feasible_time(m) = 0;
        put m into list of unscheduled messages;
    }
    while (list not empty) {
        select message m to schedule from unscheduled list;
        delete message m from unscheduled list;
        schedule m at lowest feasible time;
        for all ports p of message m   {
            for all messages ml of port p   {
                update earliest feasible time;
                delete ml from list of messages for port p;
            }
        }
    }
    rebuild lists of messages of ports;
}
```

During the update step, the Messport objects are deleted from their list in the port so that no further update is undertaken for the messages for which scheduling has already taken place. In this way, the number of Messport objects with ongoing scheduling becomes ever smaller until the list is then renewed in a last step.

Naturally, even with such an intuitive priority scheme, an incorrect choice for the next message to be planned for scheduling can be made, since these choices are made in a "greedy" manner with restricted knowledge. In an exemplary embodiment, iterative improvement is used to attempt to rectify these incorrect choices. The underlying scheme is described by the following exemplary dummy code shown in Table 4:

TABLE 4

```
improvement ( )     {
    while (solution can be improved)     {
        select a message m and remove it from the schedule;
        find best position to reinsert m into the schedule;
        reinsert m into the schedule;
    }
}
```

A further option for improving scheduling is substantially faster than the improvement specified above, since as many processing steps as possible are performed incrementally. For this purpose, a longest paths concept is necessary. After scheduling the original undirected condition graph, each connector is directed from the later planned message to the earlier planned message, thereby directing the condition graph. The length of the longest path in the graph, from any given node or from a message to any given sink of the graph produces the earliest execution time for the scheduling of the relevant message. Following connectors of the graph back and calculating the longest path produces the latest execution time, provided the overall cycle time is not extended. If the latest execution time is greater than the earliest execution time, the message exhibits what is known as slack. Remedying the slack affecting this message cannot lead to a reduction in the overall cycle time. Thus only messages without such slack form a critical path in the condition graphs and are candidates for improvement. Removing such a message from the schedule introduces additional slack for the other messages and a position in the list of planned messages found where this slack can be best utilized, for example, by using the removed message with minimal enlargement of the make span. This can be achieved by investigating messages "below" and "above" the position considered. This procedure is described, for example, by the following dummy code shown in Table 5:

TABLE 5

```
improvement  ()   {
    calculate forward and backward longest paths;
    while (solution can be improved)    {
        select any message m in a cyclic fashion;
        if (m has slack) continue;
        remove m from schedule;
        note longest paths;
        update longest paths;
        find best position for messages m;
        if (best position gives improvement) {
            reinsert m at best position;
            update longest paths;
        }
        else {
        reinsert m at old position;
        restore longest paths;
        }
    }
}
```

The best position can be found by running through the messages in the sequence in which they are planned in the scheduling. Finding the best position can, for example, be described by the following dummy code shown in FIG. 6:

TABLE 6

```
find_best_position (Messages m)    {
    for all ports p {
        initialize highest MessPort in p;
    }
    for all messages i as they have been scheduled {
        from highest MessPorts in ports of m determine earliest time for m
        from successor of highest MessPorts determine latest time for m;
        from earliest and latest time, determine increase of make span,
            when message m would be scheduled after message i;
        note position with least increase;
        increment highest MessPort for ports of i;
    }
}
```

Specific Examples

FIG. 1 illustrates the handling of messages with a number of intended destinations using a small example with four messages Ml, M2 M3 and M4 and four switches, A, B, C, D. A first port A(1) of switch A is connected to a first port B(1) of switch B, a second port B(2) of switch B is connected to a first port C(1) of switch C, and a third port B(3) of switch B to a first port D(1) of switch D. Message Ml is to be transmitted in this case from switch B to switches C and D, message M2 from switch A to switch C, message M3 from switch A to switch D, and message M4 from switch B to switch C.

Figure 2:
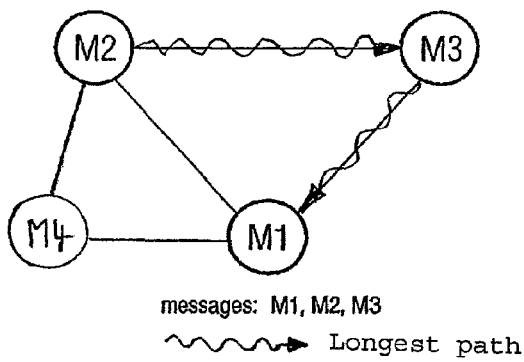
FIG. 2 illustrates a condition graph when a message is transmitted in broadcast mode according to the invention.

In broadcast mode conditions exist between messages M1, and M2 and M4, where these messages use a common port of switch B, between the messages M1 and M3, because both use a common port of switch B, and between messages M2 and M3, because both use a common port of switch A. A corresponding condition graph is shown in FIG. 2 for the case in which the message M1 is transmitted in broadcast mode.

Figure 3:
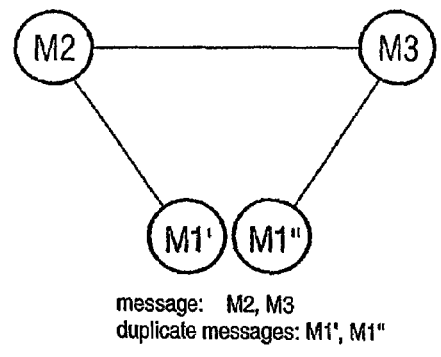
FIG. 3 illustrates a condition graph, when a message is duplicated according to the invention.

If message M1 is split into a message M1' and a message M1", new conditions arise between the message M1' and the message M2, because they feature a common port of switch B, and between message M1" and message M2, because they also feature a common port of switch B. Here, however, the size of the maximum group in the condition graph falls from three to two. FIG. 3 shows this situation, that is, when message M1 is split, i.e., duplicated.

Figure 4:
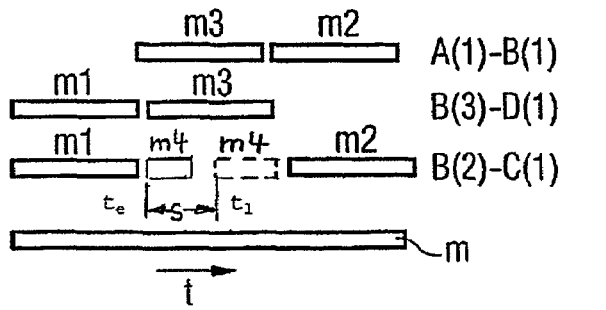
FIG. 4 illustrates a Gantt diagram for the case of FIG. 2.
Figure 5:
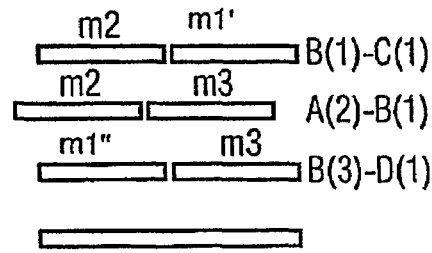
FIG. 5 illustrates a Gantt diagram for the case of FIG. 3.

FIGS. 4 and 5 show the respective result in each case, with FIG. 4 showing the solution for the message M1 in broadcast mode and FIG. 5 showing the solution with the duplicated message M1.

The ports are entered in a vertical direction over horizontal time axes in what are known as Gantt diagrams in FIGS. 4 and 5, and the seizure of the ports by messages is shown by rectangles, with diagonally struck-through rectangles indicating messages adversely affected by slack. The large rectangle below the ports in each case shows the lower time limit for scheduling.

A condition graph with a longest path between messages M2 and M3 is shown in FIG. 2. FIG. 4 illustrates the difference between a slack free message and a message with slack. For example, message m3 fits between messages m1 and m2 and cannot be moved in time without changing the total transmission time m. In other words, messages m1, m2 and m3 are slack free, i.e., the earliest and the latest time are identical. By contrast, message m4 can be transmitted starting at an earliest execution time $t_e$ or at a latest execution time $t_l$ without changing the total transmission time m. Therefore, message m4 is considered to be a message with slack and the slack s is defined as the difference between the earliest execution time $t_e$ and the latest execution time $t_l$.

Messages with more than one intended destination can thus be handled in different ways. By breaking down a message into partial messages, which are handled independently, additional data traffic is created, which can, however, increase the overall cycle time. On the other hand, if the message uses tree-type routing, that is, if it is only sent from the origin once, this can lead to conditions which are more difficult to fulfill. To find the best compromise between creating too much data traffic or of finding significant problems created by the conditions, routing and scheduling have to be modified. Routing messages for a number of recipients must be handled in two different ways.

If the message is provided with a "broadcast" flag, no specific action is needed since it is simple to exclude common subpaths when tracing the message back.

If broadcast mode is not demanded for multi-recipient messages, the message can also be sent a number of times. In this case, in accordance with the routing of the message, a separate message object is generated for each receiving switch, where all messages of this group are given a single common identification, so that the scheduling can continue to handle the messages of this group in a specific way. If according to routing the Messports of such a subdivided message mi are a subset of the other part messages mj in the same group, the destination message mi together with its Messports is removed as being redundant. Finding these subrelationships is simple when messages or partial messages are first sorted in accordance with their group identification and their lists of Messports are sorted according to the ports.

Figure 6:
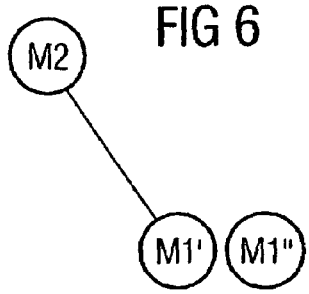
FIG. 6 illustrates a condition graph with a duplicated message according to the invention.
Figure 7:
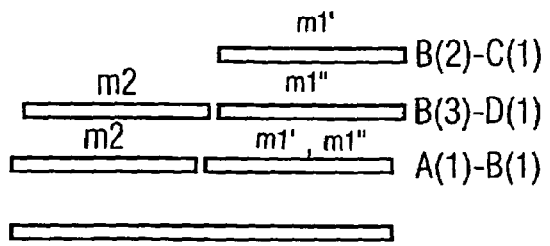
FIG. 7 illustrates a solution for the case of FIG. 6 in the form of a Gantt diagram.

Duplication of messages creates scheduling problems with fewer conditions but leads to additional data exchange, which can be partly remedied in the scheduling phase. Message duplication can also be undertaken before routing which results in greater freedom for routing. Duplication only after routing however guarantees that all partial messages of a duplication group which pass a specific given port exhibit the same relative arrival time at this port, which facilitates a re-merging of the partial messages in the scheduling phase. Scheduling partial messages which originate from the same message is treated in a particular way. These messages are given permission to be scheduled at identical times. Therefore, conditions between partial messages which are created from an original message must be taken into account accordingly. A pair of such messages can be planned, either taking account of the normal condition or at identical times by scheduling. An example of this technique is illustrated in FIG. 6 and illustrates the conditions for the example given previously when message M3 is deleted. It can be seen from the corresponding Gantt diagram in FIG. 7 that the messages M1' and M1" are now planned at the same time.

During the iterative improvement phase of scheduling, sequences of neighboring submessages which originate from a single message are given preferential treatment to other messages. These neighboring submessages are then merged, if possible, without increasing the overall cycle time. The messages are merged by concatenating the lists of Messports and removing the duplicates in the resulting list and deleting one of the two duplicative messages.

Figure 8:
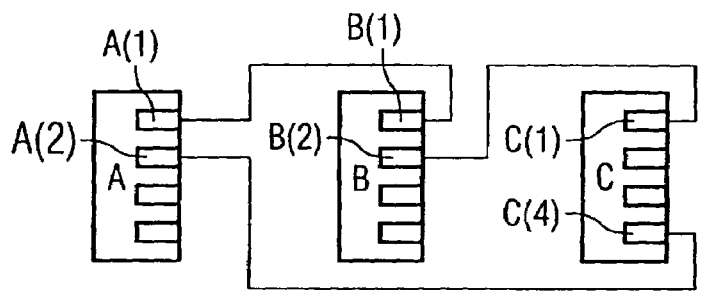
FIG. 8 illustrates a simple ring topology for explaining redundancy handling according to the invention.

Handling redundancy is explained in more detail on the basis of the simple ring topology shown in FIG. 8. This ring topology consists of switches A, B and C, with port A(1) being connected to port B(1), port B(2) with port C(1) and port A(2) with port C(4) and where messages M1 and M2 are sent from switch A to switch C in each case.

Figure 9:
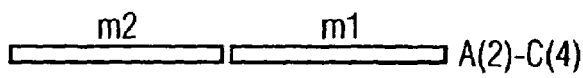
FIG. 9 illustrates a Gantt diagram with two independently routed messages for the case of FIG. 8.
Figure 10:
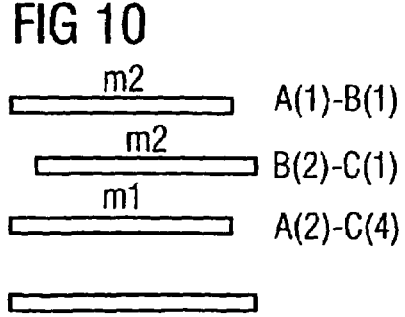
FIG. 10 illustrates two messages routed in the resource in disjoint mode for the case of FIG. 8.

During routing the procedure is as follows: after the first part of a redundant pair has been routed, the links used by this message are blocked. Subsequently, the two messages of this pair are routed and finally the blocking is cancelled. In this way no switches except for the transmitters and receivers or ports of the two parts of the pair are used. In the case of simple topologies such as rings, for example, this approach is sufficient since there is no real choice in the routing. For more complex topologies, however, there is a demand for paths to be separated according to resources which together minimize the level of costs. This problem can be resolved accurately and efficiently by handling it as a "MinCost flow problem". Scheduling is not directly affected by fault-tolerant routing; more messages merely have to be planned into the scheduling. FIG. 9 is a diagram illustrating the case in which messages M1 and M2 are routed independently. FIG. 10 is a corresponding Gantt diagram illustrating the situation for the case where messages M1 and M2 are transmitted in a mode with separated resources.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

The invention claimed is:

1. A method of communication for real-time data exchange in a collision detection-based communication network the method comprising:
   a) determining most economical data paths of the network;
   b) routing cyclic repeating real-time data to the most economical data paths of the network; and
   c) scheduling, starting from the most economical data paths determined, send times which are determined for messages of a cyclic repeating real-time data exchange with the aid of a greedy heuristic;
   wherein a message with an earliest possible execution time is given a highest priority and new execution times are calculated for messages assigned to send times not yet determined; and
   wherein further, the routing and scheduling steps are repeated until all messages are arranged in a priority list and a chronological message occupancy of switching ports of the communication network and an associated cycle duration is established.

2. A method in accordance with claim 1, further comprising: after execution of the greedy heuristic carrying out an exchange of steps in the priority list, where a slack-free message is removed and resultant slack in the other messages is used for the removed slack-free message.

3. A method in accordance with claim 1, wherein the most economical data paths are determined by selecting the shortest connections.

4. A method in accordance with claim 1, wherein the routing and scheduling steps are repeated, with the scheduling step changing cost factors for the routing step.

5. A method in accordance with claim 1, wherein a result of at least one routing and scheduling instance is displayed in a Gantt diagram, with the Gantt diagram showing a message occupancy of the switch ports of the communication network.

6. A machine-readable memory medium with commands stored thereon which cause a computer to execute the method in accordance with claim 1.

7. A method in accordance with claim 1, further comprising: minimizing the total time for messages sent in a transmission cycle by determining the most economical data paths and scheduling the send times.

8. A method in accordance with claim 1, wherein the send times are scheduled for the switching ports of switches of the network.

9. A method in accordance with claim 1, wherein the messages to be transmitted in a transmission cycle are determined in a setup phase before the cycle starts.

10. A collision detection-based communication network for real-time data exchange comprising:
   a) a determination module for determining most economical data paths of the network;
   b) a routing module for routing the cyclic repeating real-time data on the most economical data paths; and
   c) a scheduling module for scheduling starting from the most economical data paths determined, send times, which are determined for the messages of the cyclic repeating real-time data exchange with the aid of a greedy heuristic, with the message with an earliest possible execution time being given the highest priority;

wherein new execution times are calculated by the scheduling module for the messages assigned to send times not yet determined and the routing by the routing module and scheduling by the scheduling module are repeated until all messages are arranged in a priority list and a chronological message occupancy of the switching ports of the communication network, as well as the associated cycle duration, is established.

11. A method of communication for real-time data exchange in a collision detection-based communication network, the method comprising:

determining efficient data paths of the network;
scheduling send times for a plurality of messages of a cyclic repeating real-time data exchange;
arranging the plurality of messages in a priority list;
establishing a chronological message occupancy of switching ports of the network;
establishing an associated cycle duration;
wherein operations of the determining, scheduling, arranging, establishing of chronological message, and establishing of the associated cycle duration are performed in a setup phase before the plurality of messages is transmitted in the associated transmission cycle.

* * * * *